United States Patent [19]

Dermansky

[11] Patent Number: 4,465,450
[45] Date of Patent: Aug. 14, 1984

[54] HEATED ROLLER DEVICE

[76] Inventor: Ira Dermansky, 300 Katherine St., Engelwood, N.J. 07631

[21] Appl. No.: 482,982

[22] Filed: Apr. 7, 1983

[51] Int. Cl.³ .............................................. B28B 17/00
[52] U.S. Cl. ..................................... 425/143; 165/89; 165/90; 425/445
[58] Field of Search .................... 165/89, 90; 425/66, 425/143, 378 R, 445, 471; 264/34, 40.6

[56] References Cited

U.S. PATENT DOCUMENTS

| | | | |
|---|---|---|---|
| 3,309,786 | 3/1967 | Conti | 165/90 |
| 4,081,913 | 4/1978 | Salminen | 165/90 |
| 4,233,011 | 11/1980 | Bolender et al. | 425/143 |
| 4,344,236 | 8/1982 | Lindeen | 165/89 |

Primary Examiner—Donald E. Czaja
Assistant Examiner—W. Thompson
Attorney, Agent, or Firm—Howard C. Miskin

[57] ABSTRACT

A film heating apparatus includes a vertical tank vertically adjustably mounted on a base supported post, a hollow vertical roller extends between and is journaled to brackets projecting from opposite ends of the tank, an electric motor driven pump mounted on the tank circulates a heat transfer liquid through and between the roller and tank through a rotary coupling mounted on the roller, the liquid in the tank being heated by an immersion electric heater which is energized in response to a temperature sensing member responsive to the liquid temperature and a second idler roller is supported between the brackets and is transversely spaced from the first roller.

10 Claims, 4 Drawing Figures

HEATED ROLLER DEVICE

BACKGROUND OF THE INVENTION

The present invention relates generally to improvements in web handling and treating apparatus and it relates more particularly to an improved apparatus for heating an advancing thermoplastic film or pellicle attendant to its application to an article for packaging.

It is a common practice to package articles in a stretch type synthetic organic thermoplastic film and to this end the film is heated to a predetermined temperature immediately prior to its application to the article. The apparatus heretofore employed in preheating the film attendant to its application to the article possesses numerous drawbacks and disadvantages. It is generally a complicated and awkward structure of limited application and useful only with relatively narrow film of a restricted range and the heating and temperature control of the advancing film is usually poor. The precision of temperature control is low and excessive hunting often occurs so that a uniform optimum heating of the film is not achieved with the result that the packaging procedure and the quality of packaging are adversely effected. Furthermore, the speed of advance of the thermoplastic film is highly restricted thereby limiting the capacity of the apparatus and any machinery or operation with which it is associated.

SUMMARY OF THE INVENTION

It is a principal object of the present invention to provide an improved web treating and handling apparatus.

Another object of the present invention is to provide an improved apparatus for heating an advancing web.

Still another object of the present invention is to provide an improved apparatus for heating an advancing stretch thermoplastic film to a predetermined temperature attendant to its packaging application to an article.

A further object of the present invention is to provide an improved apparatus for heating an advancing thermoplastic film to a precisely controlled predetermined temperature independent of ambient conditions and which is of high capacity and applicable to wide as well as narrow film and is contructed as a unit easily associatable with other equipment, processes and operations.

Still a further object of the present invention is to provide a device of the above nature characterized by its ruggedness, simplicity, high reliability, precise control and high versitility and adaptability.

The above and other objects of the present invention will become apparent from a reading of the following description taken in conjunction with the accompanying drawings which illustrate a preferred embodiment thereof.

A web heating apparatus in accordance with the present invention is constructed as a unit assembly and includes an upright tank mounted on a base member and including vertically spaced inlet and outlet ports, an electrical heating member in heat transfer relationship with the interior of the tank, a vertical tubular main roller having having an internal axial bore, a heat transfer fluid contained within the tank and main roller, means including an electric motor driven pump and a rotatable fluid coupling connected to an end of the main roller and communicating with the interior thereof for circulating the fluid between the tank and main roller and along the length of the main roller, and means responsive to the temperature of the fluid for controllng the energization of the heating member to regulate the temperature of the fluid to a predetermined value.

In its preferred construction the tank is a vertical tubular member, the heater member being a metal sheathed electrical resistance heater located within the bottom of the tank. A pair of brackets project from opposite ends of the tank and the main roller extends between and is rotatably journalled to the brackets. The fluid coupling is mounted atop the main roller and has an axial inlet port communicating by way of a coaxial tube with the bottom of the main roller and an outlet port eccentrically communicating with the top of the main roller. The pump is mounted to the tank and its inlet is connected to the bottom of the tank and its outlet is connected by a vertical pipe to the fluid coupling inlet and the coupling outlet is connected to the upper part of the tank. The base member includes an upright post to which the tank is vertically adjustably mounted and a central box is mounted on the tank and controls the energization of the electrical heater in response to a surface temperature sensing member in heat communication with a face of the tank. An idler second vertical roller spaced from the main roller is also supported between the brackets.

The improved apparatus is simple, rugged, inexpensive, highly reliable and precise and of great versitility and adaptability.

DESCRIPTION OF THE PREFERRED EMBODIMENT

Figure 1:
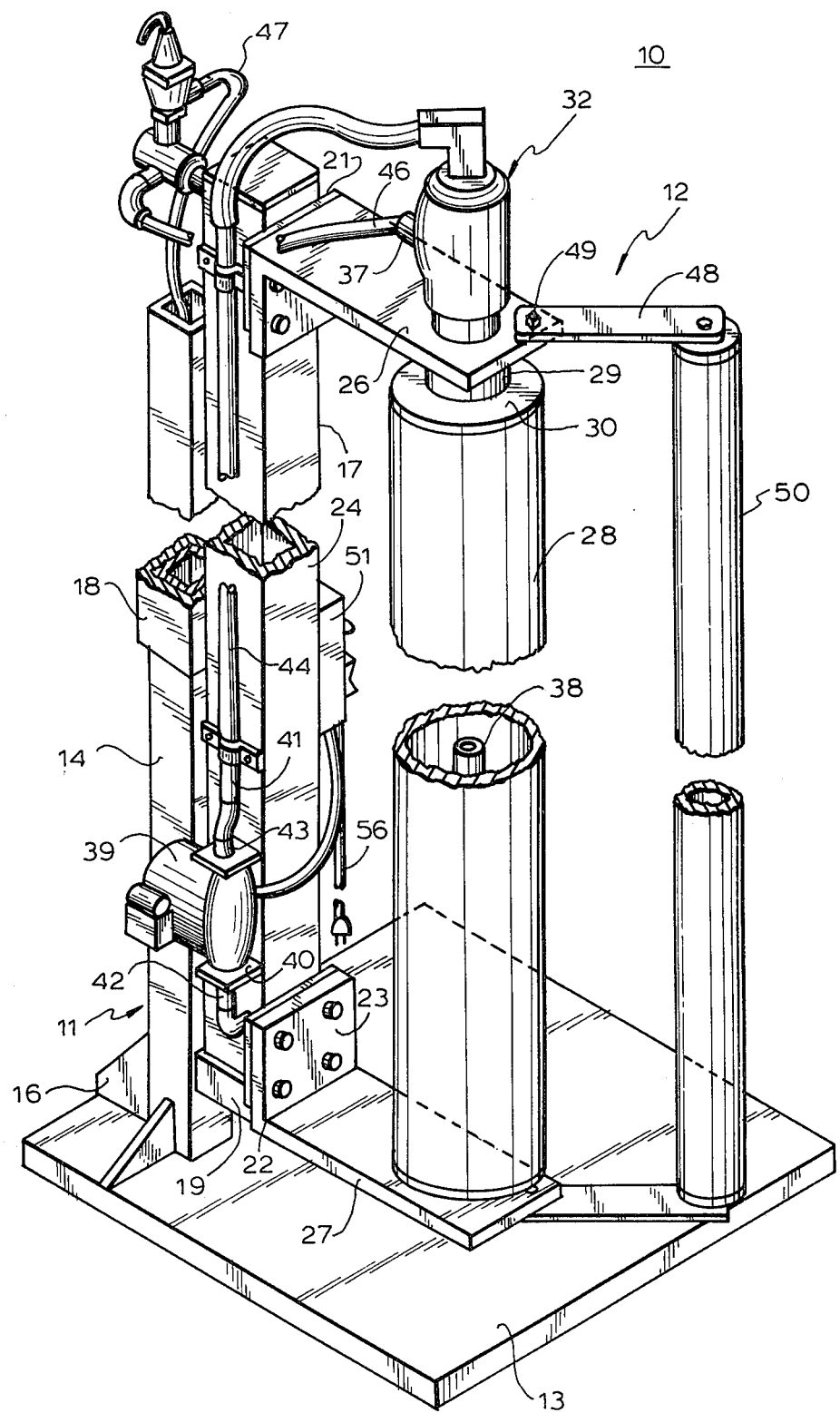
FIG. 1 is a partially fragmented front perspective view of an apparatus embodying the present invention.
Figure 2:
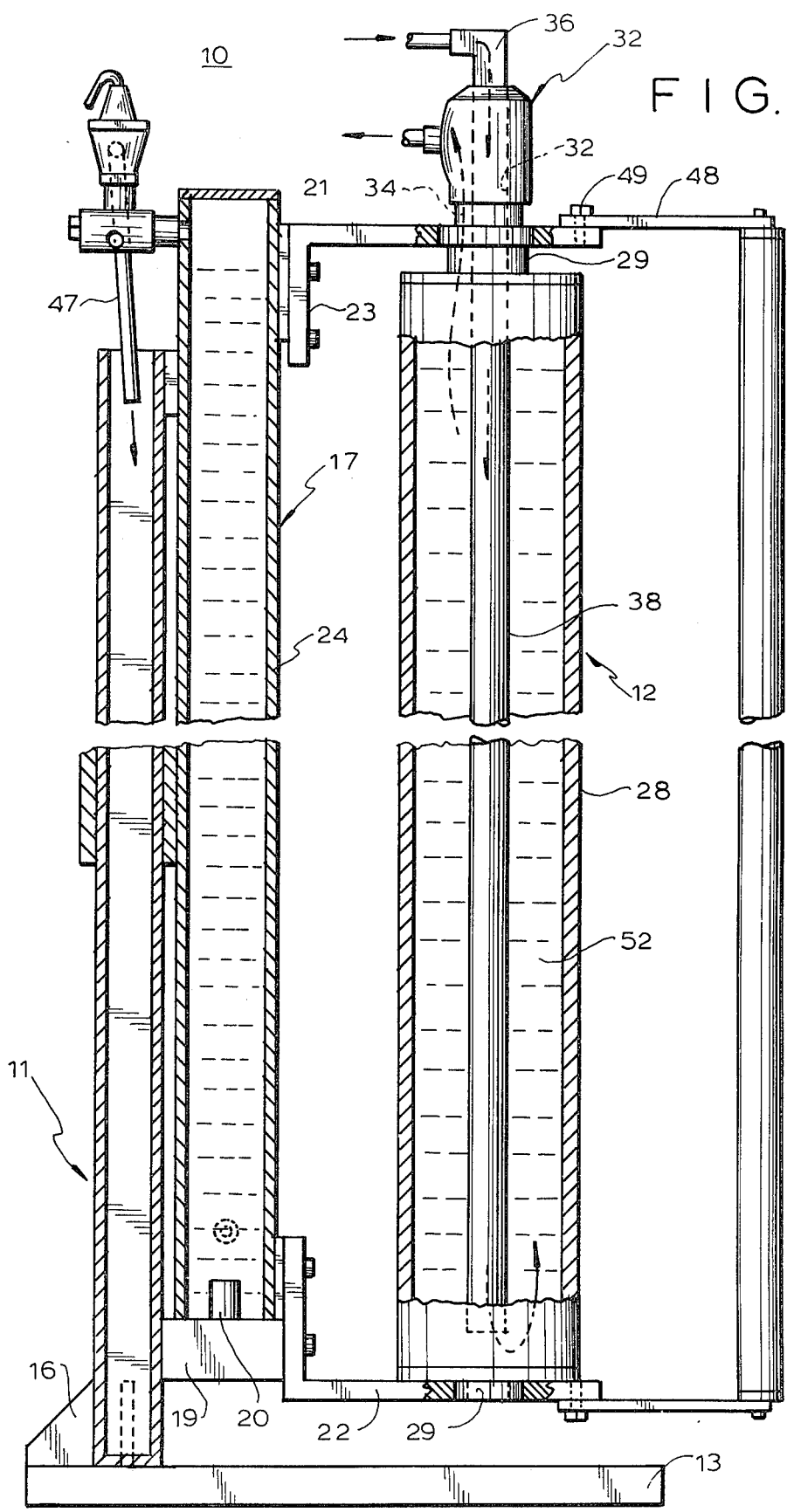
FIG. 2 is a vertical longitudinal sectional view thereof.
Figure 3:
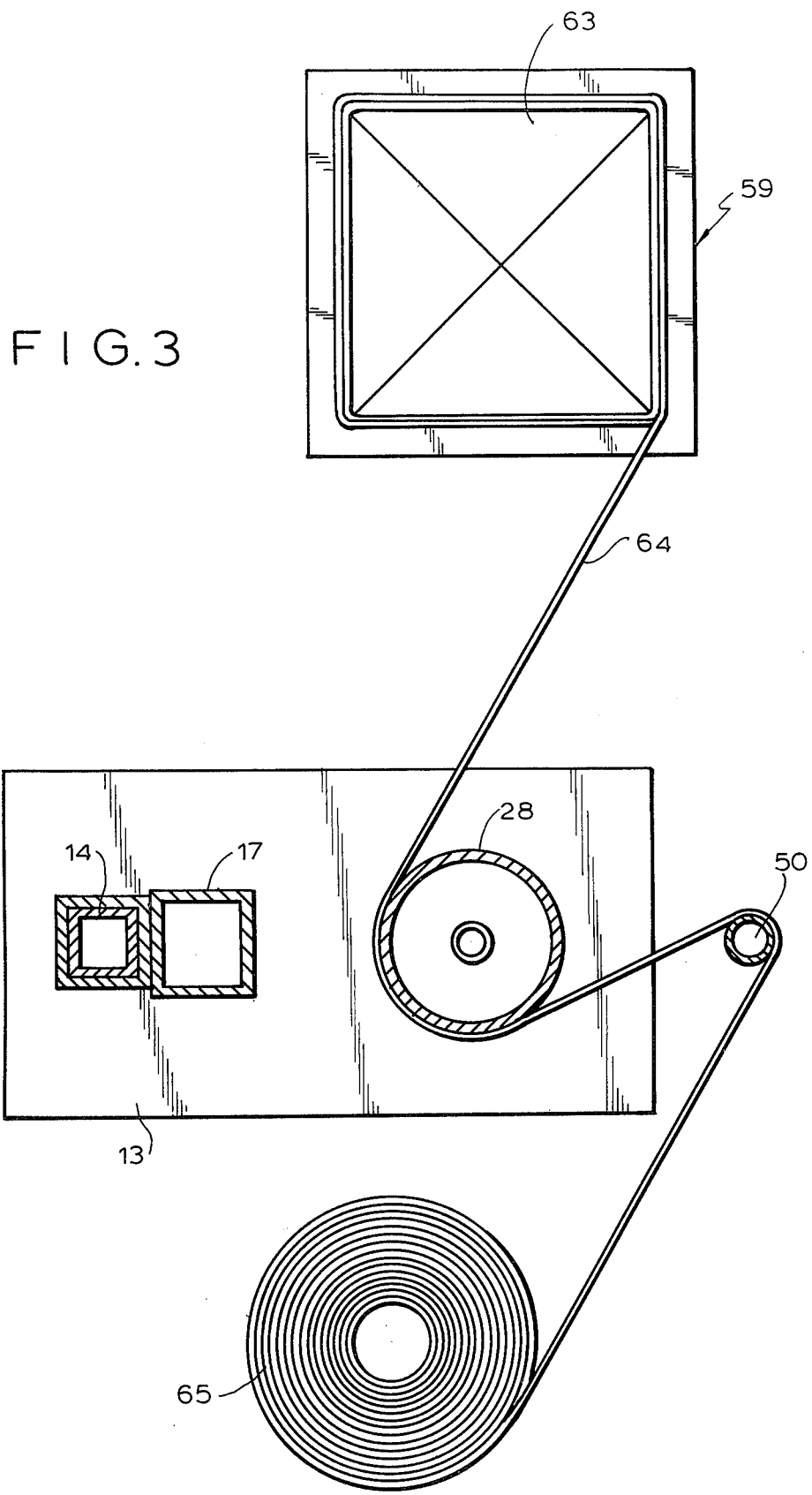
FIG. 3 is a sectional view taken along line 3—3 in FIG. 2 illustrating the application of the apparatus.
Figure 4:
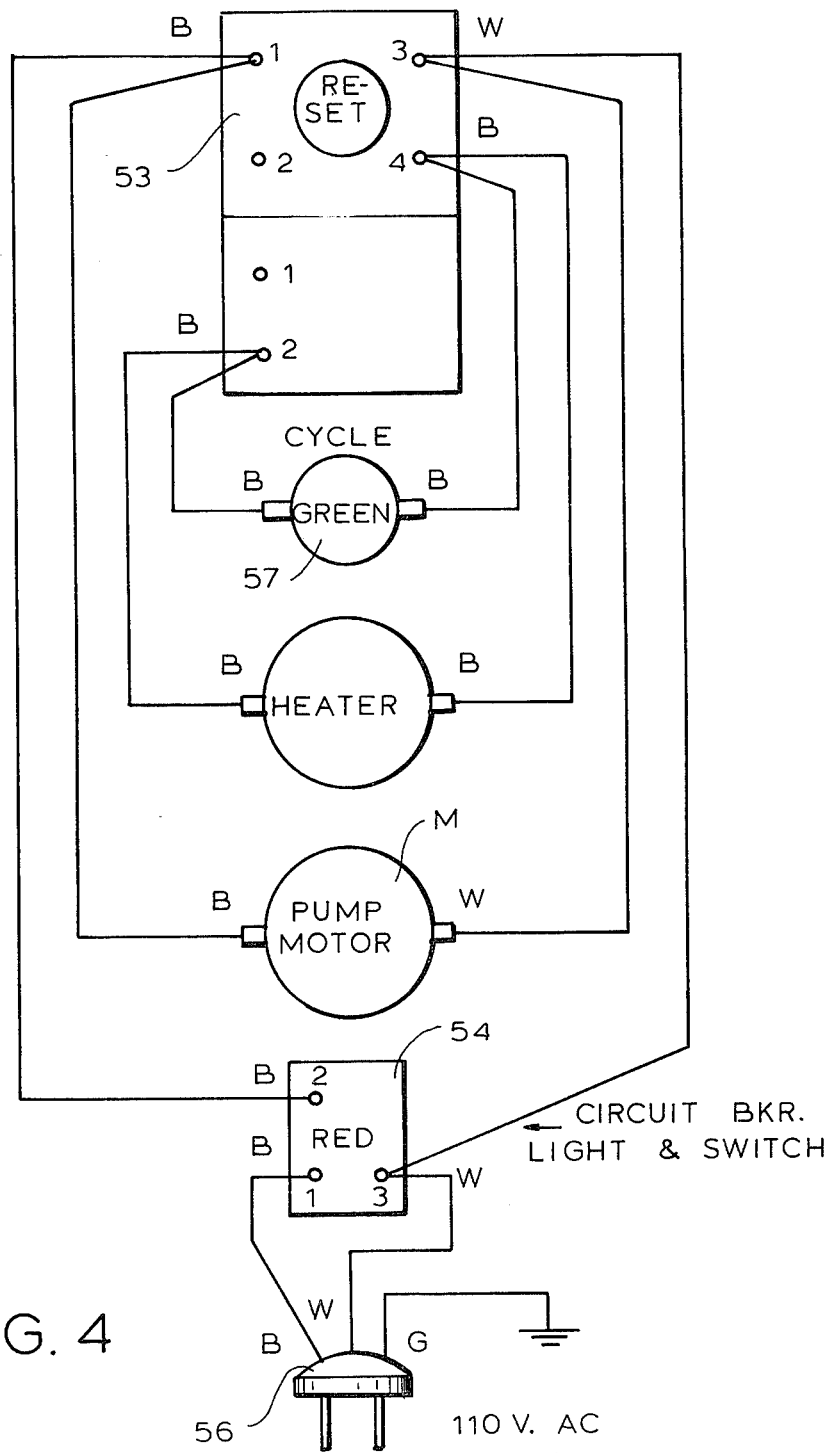
FIG. 4 is a diagram of the apparatus electrical control network.

Referring now to the drawings which illustrate a preferred embodiment of the present invention, the reference numeral 10 generally designates the improved apparatus which includes a support structure 11 and a heated roller assembly 12. The support structure 11 comprises a flat rectangular base plate 13 along the medial rear border of which is mounted an upwardly projecting, vertical rectangular hollow post 14 open at its top and secured at its bottom to base plate 13 by reinforcing gussets 16.

The heated roller assembly 12 includes a narrow vertical rectangular tank 17 disposed shortly forwardly of and parallel to post 14. Mounted to the rear face of tank 17 intermediate its top and bottom is a rectangular coupling collar 18 which vertically slidably engages post 14 and is suitably releasably vertically fixed in any desired position, for example by set screws to permit the vertical adjustment of tank 17 along post 14. The bottom end of tank 17 is closed by an electrical heating unit 19 a portion of 20 of which projects into the interior of tank 17, the upper end of tank 17 being sealed by a top end plate.

Secured to and projecting forwardly from the top and bottom of the front face 24 of tank 17 is a pair of top and bottom brackets 21 and 22 respectively, each including a vertical arm 23 overlying and bolted to tank front face 24 and including parallel horizontal top and bottom legs 26 and 27 respectively. A hollow, cylindrical freely rotatable main roller 28 extends vertically between bracket arms 26 and 27 and is journaled to the bracket arms 26 and 27 by opposite end ball bearing members 29. Mounted on upper bracket arm 26 and connected to the upper end wall 30 of main roller 28 is a rotary fluid coupling 32 having an axial passageway 33 and an eccentric passageway 34 providing, respectively, communication between first and second couplings 36 and 37 respectively and the interior of main roller 28.

A feed pipe 38 connected at its top to rotary coupling passageway 33 extends coaxially from roller top wall 30 to a bottom discharge point shortly above the bottom wall of main roller 28. The exhaust from the main roller interior to coupling 37 is through an opening in roller top wall 30 and eccentric passageway 34.

An electric motor driven fluid circulating pump, preferably a centrifugal pump 39, is mounted by means of brackets 40 to a side wall of 41 of tank 17 shortly above the bottom of the side wall 41. The inlet 42 to pump 39 is connected by a short conduit to the lower part of tank 17 proximate heater element 20 and the outlet 43 of pump 39 is connected by a pipe 44 extending along and secured to tank side wall 41 to the coaxial inlet elbow connector 36 of rotary coupling 32. The outlet connector 37 of rotary coupling 32 is connected by a tube 46 through an adjustable pressure relief safety valve of conventional construction to the interior of the upper part of tank 17, the pressure relief valve overflow outlet communicating by way of a tube 47 with the top opening of post 14.

A pair of horizontal parallel verticaly spaced bracket arms 48 project outwardly from upper and lower bracket legs 26 and 27 and are angularly adjustable about a vertical axis and fixed in preselected positions by bolts 49 connecting the overlapping inner and outer ends of arms 48 and a respective leg 26 and 27. Extending between and journalled to the outer ends of bracket arms 48 is a freely rotatable idler roller 50 parallel to main roller 28.

Mounted to a side wall of tank 17 opposite tank side wall 41 is a control box 51 which houses the network for controlling the motorized pump 39 and for automatically controlling the energization of heater member 19 which in turn heats and regulates the temperature of a liquid heat transfer medium 52 contained within tank 17 and main roller 28 and circulated through and between the tank and roller by pump 39.

The drive motor M of pump 39 is connected by way of a manually operable switch 53 and resettable circuit breaker 54 to a power cord 56 for energizing motor M and electric heater 19. A temperature sensing or responsive member such as for example, a surface temperature sensing thermostat, is in heat transfer engagement with the tank wall underlying control box 51 and responds to the temperature of liquid medium 52 through the heat conductive tank wall. The thermostat, through any suitable or well known network contained in control box 51, connects and disconnects heater 19 to the electric power source by way of cord 56 to electrically energize or deenergize heater 20 as the liquid medium temperature as sensed by the thermostat falls below or rises above an adjustable predetermined temperature. Heat regulating devices and motor control networks of the above nature are well known and require no detailed descriptions. A first indicator lamp 57 mounted on control box 51 is connected across heater 20 and is energized with the energization of heater 20 and a second indicator lamp likewise mounted on control box 51 is connected across motor M to be energized with the energization of the motor. A safety second thermostat set to respond at a temperature above the regulator thermostat may be provided to deenergize the heater 20 in the event of the failure of the first thermostat.

In the application of the improved apparatus 10, the apparatus 10 is firmly positioned relative to the associated equipment for example a rotatable palette device 59, by firmly securing the apparatus 10 to the device 59 or by securing the base plate 13 to the floor by logging or the like. The roller assembly 12 is then adjusted to the desired level by loosening collar 18, adjusting the level of assembly 12 by means of a suitable jack and then tightening collar 18. The heating and temperature regulating operation is initiated by closing the energization switch to energize pump motor M and the heater energizing network. The heat transfer medium 52 which is advantageously a high boiling point organic liquid, for example, a polyethylene glycol or the like, or water or mixtures thereof, is rapidly circulated by pump 39 through and between tank 17 and roller 28, being heated by heater 19 as it traverses tank 17. When the temperature of medium 52 and hence roller 28 reaches the desired level as evidenced by the extinguishing of lamp 57, apparatus 10 is ready for use.

An article or product 63 to be wrapped is positioned on the table of rotatable palette 59. A thermoplastic sheet is drawn from a rotatable vertical roll 65 thereof advanced around idler guide roller 50 and thence around the heated temperature regulated main roller 28 to correspondingly heat termoplastic sheet 64. The heated sheet 64 is then wrapped around article 63 which is rotated with palette 63 to draw the sheet 64 from roller 65 and advance it along the idler and heater rollers. As heat is drawn from the roller 28 to lower the temperature of liquid medium 52 the thermostat responds to energize heater 19 to heat the medium 52 and return it to the desired temperature. By reason of the high volume of the heat exchange medium and its high specific heat there is little hunting and the temperature of the heating roller 28 is maintained substantially constant under widely varying ambient conditions and conditions of use of the apparatus.

While there has been described and illustrated a preferred embodiment of the present invention it is apparent that numerous alterations, omissions and additions may be made without departing from the spirit thereof.

I claim:

1. A web treating apparatus comprising a longitudinally extending tank, a longitudinally extending hollow roller transversely spaced from and rotatably supported by said tank, a heat transfer fluid contained within said tank and roller, means for circulating said fluid through and between said tank and roller and means for heating and regulating the temperature of said fluid to a predetermined value.

2. The web treating apparatus fo claim 1 wherein said fluid circulating means comprises an electric motor driven pump connected between and communicating with said tank and roller.

3. The web treating apparatus a claim 2 wherein said circulating means includes a rotary fluid coupling located at one end of said roller and having a pair of external ports and a pair of internal ports including an axial port and an eccentric port, said eccentric port communicating with the proximate end of the interior of said roller and an axial pipe connecting the axial port with the opposite end of the interior of said roller, one of said external ports being fluid connected to one end of said tank and the other of said external ports being connected through said pump to the other end of said tank.

4. The web treating apparatus of claim 3 wherein said fluid heating means includes an electrically energized heater immersed in the fluid in said tank.

5. The web treating apparatus of claim 4 wherein said fluid heating means comprises a temperature responsive element responsive to the fluid temperature and means responsive to said temperature responsive element for controlling the energization of said electrically energized heater.

6. The web treating apparatus of claim 1 comprising means for supporting said tank and roller as a unit with their longitudinal axis extending vertically.

7. The web treating apparatus of claim 6 wherein said supporting means comprises a bottom base member, a vertical post mounted on and projecting vertically from said base member and means connecting said tank to said post.

8. The web treating apparatus of claim 7 wherein said tank and roller are vertically adjustable along said post.

9. The web treating apparatus of claim 6 including a pair of vertically spaced brackets projecting outwardly from and secured to said tank, said roller extending between and journaled at its opposite ends to said brackets.

10. The web treating apparatus of claim 9 comprising an auxilliary idler roller vertically extending between and rotatably supported by said brackets parallel to and transversely spaced from said hollow roller.

* * * * *